(12) United States Patent
Mathias (10) Patent No.: US 6,386,773 B1
(45) Date of Patent: May 14, 2002

(54) ERGONOMIC KEYBOARD

(76) Inventor: Joseph Mathias, 1909 Effingham St., Ridgeville (CA), L0S 1M0

( * ) Notice: Subject to any disclaimer, the term of this patent is extended or adjusted under 35 U.S.C. 154(b) by 0 days.

(21) Appl. No.: 09/523,528

(22) Filed: Mar. 10, 2000

(51) Int. Cl.[7] .................................................. B41J 5/28
(52) U.S. Cl. ...................................... 400/485; 400/489
(58) Field of Search .................................. 400/485, 472, 400/489, 480; 341/21, 22; 200/5 R, 52 R (56) References Cited

U.S. PATENT DOCUMENTS

| | | | | |
|---|---|---|---|---|
| 3,633,724 A | | 1/1972 | Samuel ........................ 197/100 |
| 4,201,489 A | | 5/1980 | Zapp ........................... 400/485 |
| 4,584,443 A | * | 4/1986 | Yaeager ....................... 400/485 |
| 4,769,516 A | | 9/1988 | Allen ............................. 200/5 |
| 4,897,649 A | * | 1/1990 | Stucki ........................... 341/22 |
| 4,917,516 A | * | 4/1990 | Retter ......................... 400/489 |
| 5,017,030 A | | 5/1991 | Crews ......................... 400/485 |
| 5,087,910 A | * | 2/1992 | Guyot-Sionnest ........... 400/489 |
| 5,388,922 A | * | 2/1995 | Smiley ........................ 400/492 |
| 5,486,058 A | | 1/1996 | Allen .......................... 400/485 |
| 5,499,041 A | * | 3/1996 | Brandenburg et al. ...... 345/174 |
| 5,743,666 A | * | 4/1998 | VanZeeland et al. ........ 400/485 |
| 5,889,507 A | * | 3/1999 | Engle et al. ................. 345/161 |

* cited by examiner

*Primary Examiner*—Andrew H. Hirshfeld
*Assistant Examiner*—Anthony H. Nguyen (57) ABSTRACT

The present invention an ergonomic keyboard designed for inputting data wherein said keyboard comprises; a keyboard housing; a plurality of four position finger boxes mounted in said housing and arranged conformably to receive finger tips of a users hand, wherein said finger boxes are responsive to no movement, depression, contraction and extension of said fingertips corresponding to at least 4 distinct finger box positions namely: neutral, downward, backward, and forward respectively. The keyboard further has a processor for assigning letters, numerals, symbols and functions to each of said positions of said finger boxes; and contacts at each of the positions of each of said finger boxes such that a unique signal is produced for each position of said finger boxes.

14 Claims, 11 Drawing Sheets

ERGONOMIC KEYBOARD

FIELD OF THE INVENTION

The present invention relates to a finger operated keyboard and particularly to finger operated ergonomic keyboard for data entry, word processing, and/or typewriter like functions. The keyboard is specifically designed for an International, Absolute, Phonetic English, but can also be used for English, Spanish, French, Arabic, Mandarin, and many other languages used in the world.

BACKGROUND OF THE INVENTION

The conventional typewriter keyboard includes several horizontal rows of keys oriented transversally to an operator. The conventional arrangement of letters of such a keyboard is sometimes referred to as the QWERTY format after the first six letters on the top row of the letter keys. The QWERTY format was developed in the late 1800's and has remained the standard keyboard format to date for typewriters as well as for computers, word processors, and other data entry terminals.

The QWERTY format keyboard suffers from several disadvantages. A hand moving up and down the keyboard is required to position for striking keys on the upper and lower portions of the board. Even when it is not necessary to move the entire hand substantial finger movement is required to move the fingers between keys on adjacent rows or between adjacent keys on the same row. Such hand and finger movement decreases the rate at which an operator can enter data via the keyboard, and increases the possibility of making errors.

Inventors have secured patents to facilitate data entry on mechanical typewriters, electric typewriters, word processors, and computer keyboards. Many are designed to overcome difficulty of data entry on the standard QWERTY design which is expanded to six horizontal banks of a hundred and one vertically activated keys on the computer style keyboard.

The disadvantage of these keyboards is the large amount of finger and/or hand movement required by both left and right hands in order to activate the keys on the board. The conventional keyboard lends itself to making mistakes, getting tire, and carpel tunnel in wrists; while the ergonomic minimizes these problems.

The Prior Art

U.S. Pat. No. 5,486,058—Titled: Continuous Touch Keyboard by Donald E. Allan issued Jan. 23, 1996, describes a continuous touch keyboard in which a three position key is provided for each finger. The keys are arranged in order to align with the fingers of a cupped pendant hand, and the actuator for fingers two, four, and five and the thumb are elevated above the other keys. In addition, the patent describes thumb keys as well as palm rests for the left and the right hand. The disadvantage with this keyboard is the limitation of the number of characters that can be designated, and as well the difficulty in distinguishing between the positions available for each key.

U.S. Pat. No. 4,769,516 also by Donald E. Allan—Titled: Finger Operated Switching Apparatus—Issued: Sep. 6, 1988, also describes a keyboard in which four keys for each finger are arranged in a manner comfortable to the hand with the keys at various elevations above the keyboard. The patent describes a very sophisticated and complicated key in order to provide for the three positions each key can be moved into. The draw backs of this design are the number of characters or indicia which can be designated on the keyboard, and in addition, the inability for the operator to be able to distinguish exactly between the different positions of the keys. Furthermore, the ergonomics of the switch design is such that the switches must be elevated at different heights in order to be useful for the operator.

Therefore, it is desirable to have a keyboard which requires a minimum amount of movement of the operator's fingers and hands, and is able to produce the maximum number of characters in one keyboard.

SUMMARY OF THE INVENTION

The present invention a ergonomic keyboard for inputting data, said keyboard comprises:

a) a keyboard housing;

b) a plurality of four position finger boxes mounted in said housing and arranged conformably to receive finger tips of a users hand, wherein said finger boxes are responsive to no movement, depression, contraction and extension of said fingertips corresponding to at least 4 distinct finger box positions namely: neutral, downward, backward, and forward respectively;

c) means for assigning letters, numerals, symbols and functions to each of said positions of said finger boxes; and d) means for sensory of each of the positions of each of said finger boxes such that a unique signal is produced for each position of said finger boxes.

Preferably finger boxes defining finger openings in said housing which are recessed cavities and located below said keyboard top such that said fingertips fall naturally into said cavities.

Preferably further comprising at least one palm/wrist pad elevated above said keyboard top for placement of palm or wrist thereon such that when a users palm or wrist rests on said palm/wrist pad a users finger tips fall naturally into said finger boxes located below said keyboard top.

Preferably said finger boxes are six position finger boxes adapted to be responsive to 6 distinct finger tip positions, namely: neutral, downward, backward, and forward being positions 1 to 4 as claimed above and in addition, said finger boxes being responsive to sequential movement of the fingertip namely forward then downward movement of said fingertips being the fifth position and backward then downward movement of the fingertip being the sixth position.

Preferably said finger boxes are eight position finger boxes adapted to be responsive to 8 distinct finger tip positions, namely: neutral, downward, backward, and forward, forward then downward, backward then downward, being positions 1 to 6 as claimed above, said finger boxes being responsive to further sequential movements of the fingertip namely downward then forward being the seventh position, and downward then backward being the eighth position.

Preferably said keyboard includes at least five finger boxes, one for each finger and thumb.

Preferably said keyboard includes two palm/wrist pads and at least ten finger boxes; one pad.

Preferably for each hand and one finger box for each finger and thumb.

Said keyboard includes two palm/wrist pads and at least fourteen finger boxes; one pad for each hand and one finger box for each finger and thumb, two finger boxes for the index and little fingers of both hands.

Preferably wherein;

a) said palm/wrist pad is a three post pad naturally in a neutral position, and moveable into a forward position and rearward position; and b) and further including a means sensory of each of the positions of each of said palm/wrist pads, such that a unique signal is produced for each position of said finger boxes.

Preferably wherein a) said palm/wrist pad is a five position pad movable into a neutral position, forward position and rearward position; and b) and further including a means sensory of each of the positions of each of said palm/wrist pads such that a unique signal is produced for each position of said finger boxes.

Preferably said finger boxes include a vertical key with corresponding contacts and two horizontal levers each with corresponding contacts, said key and levers responsive to no movement, said vertical key responsive to depression of said fingertip for closing one set of contacts, one of said horizontal levers responsive to contraction of said fingertip for closing a second set of contacts, and one of said horizontal levers responsive to extension of said fingertips for closing a third set of contacts.

Preferably wherein said horizontal levers are pivotally attached to said keyboard housing with a slot joint, such that said horizontal levers pivot about said slot joint when horizontally urged by a finger tip thereby converting lever horizontal motion to lever vertical motion for closing said contacts.

Preferably wherein said finger box being capable of sequential movement of said finger tips and wherein sensory means being responsive to sequential closing of said contacts, sequential closing of said contacts accomplished by forward then downward movement of said fingertips being the fifth position and backward then downward movement of the fingertip being the sixth position.

Preferably wherein said finger boxes being eight position finger boxes adapted to be responsive to 8 distinct finger tip positions, namely: neutral, downward, backward, and forward, forward then downward, backward then downward, being positions 1 to 6 as claimed above, said finger boxes being capable of further sequential movements of the fingertip namely downward then forward being the seventh position, and downward then backward being the eighth position.

Preferably further comprising at least one palm/wrist pad elevated above said keyboard top for placement of palm or wrist thereon such that when a users palm or wrist rests on said palm/wrist pad a users finger tips fall naturally into said finger boxes located below said keyboard top.

Preferably wherein said palm/wrist pad comprises a) a hand rest rigidly connected to moveable control stick which is connected to said keyboard housing at a ball and socket joint, such that said palm/wrist pad pivots about said ball and socket joint, b) said palm/wrist pad is a three position pad movable into a neutral position, forward position and rearward position; and c) and further including a means sensory of each of the positions of each of said palm/wrist pads.

An alternate embodiment of the present invention a finger box for receiving a finger tip therein said finger box comprises:

a) a vertical key with corresponding contacts;

b) two horizontal levers each with corresponding contacts, c) said finger boxes defining finger openings being recessed cavities adapted such that fingertips fall naturally into said cavities; and d) said key and levers responsive to no movement, said vertical key responsive to depression of said fingertip for closing one set of contacts, one of said horizontal levers responsive to contraction of said fingertip for closing a second set of contacts, and one of said horizontal levers responsive to extension of said fingertips for closing a third set of contacts.

Preferably wherein said horizontal levers are pivotally attached to a housing with a slot joint, such that said horizontal levers pivot about said slot joint when horizontally urged by a finger tip thereby converting lever horizontal motion to lever vertical motion for closing said contacts.

Preferably wherein said finger box being capable of sequential closing of said contacts accomplished by forward then downward movement of said fingertips being the fifth position and backward then downward movement of the fingertip being the sixth position.

Preferably wherein said finger boxes being eight position finger boxes adapted to be responsive to 8 distinct finger tip positions, namely: neutral, downward, backward, and forward, forward then downward, backward then downward, being positions 1 to 6 as claimed above, said finger boxes being responsive to further sequential movements of the fingertip namely downward then forward being the seventh position, and downward then backward being the eighth position.

BRIEF DESCRIPTION OF THE DRAWINGS

The invention will now be described by way of example only, with references to the followings drawings in which.

DETAILED DESCRIPTION OF THE PREFERRED EMBODIMENT

Figure 3:
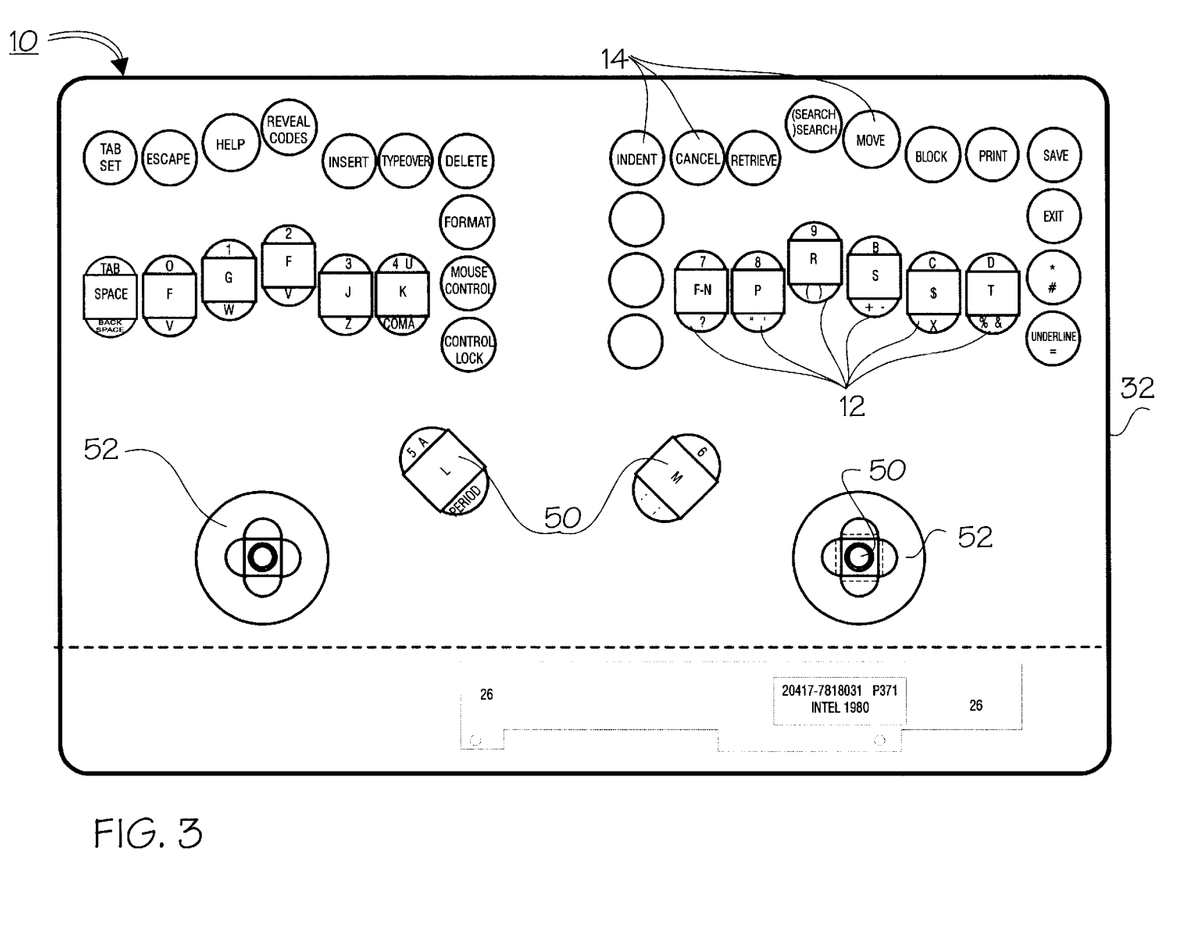
FIG. 3 is a schematic top plan view of the ergonomic keyboard showing the finger boxes, finger switches as well as the palm/wrist pads mounted on the keyboard.

Referring, first of all, to FIG. 3 the present invention, an ergonomic keyboard shown generally as 10, includes two sets of six finger boxes 12, one set corresponding to the right hand on the right hand side of keyboard top 32 and the other side corresponding to the left hand on the left side of keyboard top 32 as depicted in FIG. 3. Ergonomic keyboard 10 also includes two thumb actuators 50, one for the right hand, one for the left hand. Ergonomic keyboard 10 also includes palm/wrist pads 52, one for the right hand and one for the left hand and also a number of finger switches shown as 14, which are mounted in close proximity and preferably above and to the left and to the right of finger boxes 12. As depicted in FIG. 3 for the left hand ten finger switches 14 are provided and for the right hand fourteen finger switches 14 are provided. The number of finger switches 14 can vary depending upon the application, or they can be omitted completely.

Figure 1:
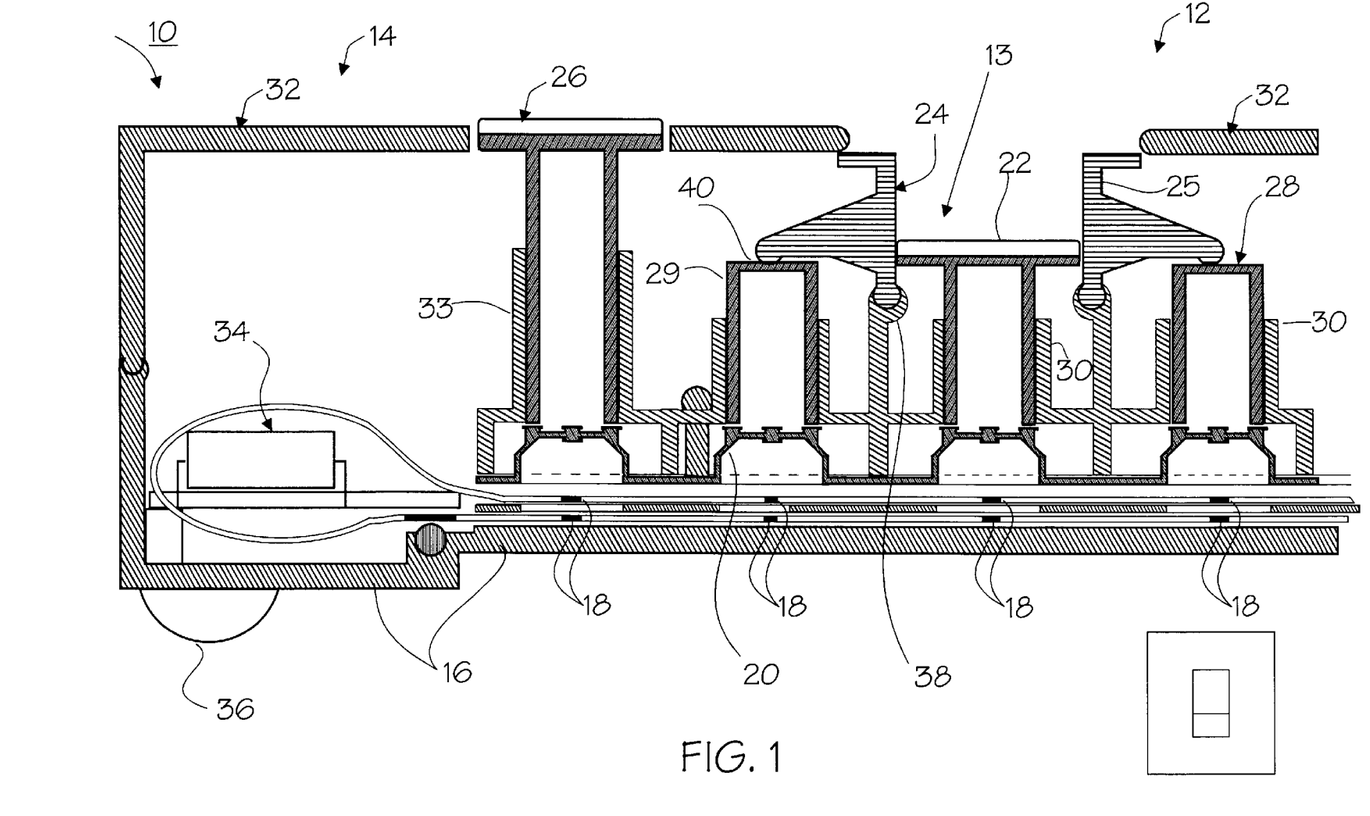
FIG. 1 is a side elevational view of the present invention, an ergonomic keyboard taken through finger box 12 and finger switch 14 in order to show the details of the mechanical arrangement.

Referring now to FIG. 1 showing the details of finger boxes 12 as well as finger switches 14 and the mechanical workings. Ergonomic keyboard 10 has specially designed finger boxes 12 which can be three, five or seven way switches (not including the home position) or a four, six or eight way switch including the home or neutral position actuated by finger tip pressure. Finger boxes 12 are specially designed in order to allow the tip of a finger to fall naturally into finger opening 13 of finger boxes 12. As depicted in FIGS. 1 and 3, finger opening 13 is a square shaped box like receptacle, however, in practice any shape is possible including a round or slender oval type opening and/or any other shape as long as finger opening 13 is dimensioned and adapted to permit placement of a finger therein so that a finger can make contact with vertical keys 22 and horizontal levers 24 and 25.

All finger tip positions are obtained by simple depression, retraction or extension of a finger tip. It may be necessary to combine in sequence two finger tip motions to obtain a desired position as will be detailed below.

Finger boxes 12 include a vertical key 22 as well as two horizontal levers 24 and 25 which are used to actuate switches using finger pressure only. Finger box 12 operating as a three way switch allows for one switching position when vertical key 22 is depressed vertically with a fingertip. The second and third switch positions are accomplished by horizontally urging horizontal lever 24 by extending a finger in opening 13 or by urging horizontal lever 25 by retracting a finger in finger opening 13 thereby urging the other horizontal lever 25 backwards.

Vertical key 22 is received slidably within key guide 30, and when urged downwardly on key dome 20 closes the printed circuit contact 18 directly below vertical key 22.

Horizontal levers 24 and 25 are attached with a snap connection using a slot joint 38 which permits horizontal lever 24 and 25 to pivot about slot joint 38 such that when horizontal lever 24 or 25 is urged they pivot about slot joint 38 and pressure is applied by horizontal lever 24 or 25 to lever key 28 or lever key 29, thereby vertically moving lever key 28 or 29 downwardly and slidably along key guide 30. Lever keys 28 and 29 depress key domes 20 and close the contact of printed circuit contact 18 located vertically below lever keys 28 and 29.

Note that each switch position of finger box 12 operates totally independently from the other. For example, it is possible to actuate horizontal lever 24 without actuating vertical key 22 or horizontal lever 25. Similarly, it is possible to actuate vertical key 22 without actuating horizontal levers 24 or horizontal lever 25, and so forth.

Finger box arrangement 12 can also operate as a five position switch. The fourth position is obtained by actuating horizontal lever 24 and then depressing vertical key 22. The fifth position is obtained by actuating horizontal lever 25 and then actuating vertical key 22 thereby consecutively closing the printed circuit contacts 18 below vertical key 22 and lever key 28. The user of finger box 12 can independently actuate horizontal lever 24, key 22 and horizontal lever 25, and/or can consecutively actuate horizontal lever 24 and vertical key 22 or consecutively actuate horizontal lever 25 and vertical key 22. In this manner, finger box 12 can be placed into five distinctly separate positions by movement of a single finger. Including the home or neutral position, finger box 12 has six distinct positions, actuated by a single finger or a thumb movement.

Finger box 12 can also operate as a seven position switch (not including the home position) by making the switching dependent upon the sequence in which the keys are depressed. For example, first depressing vertical key 22 and then urging horizontal lever 24 would constitute one position, whereas, first urging horizontal lever 24 and then depressing vertical key 22 would constitute a second position. In a similar fashion, first depressing vertical key 22 and then horizontal lever 25 would constitute a third position, and first urging horizontal lever 25 and then vertical key 22 would constitute a fourth position. The fifth position would simply be depressing vertical key 22, sixth position would be urging horizontal lever 24, seventh position would be urging horizontal lever 25, and if we include the home position (the neutral position) ie; depressing no keys would represent an eighth position.

In addition, ergonomic keyboard 10 may include finger switches 14 which include vertical buttons 26 slidably and vertically received within button guides 33 such that depressing vertical button 26 actuates key domes 20, thereby closing printed circuit contacts 18 vertically below each respective vertical button 26.

Figure 4:
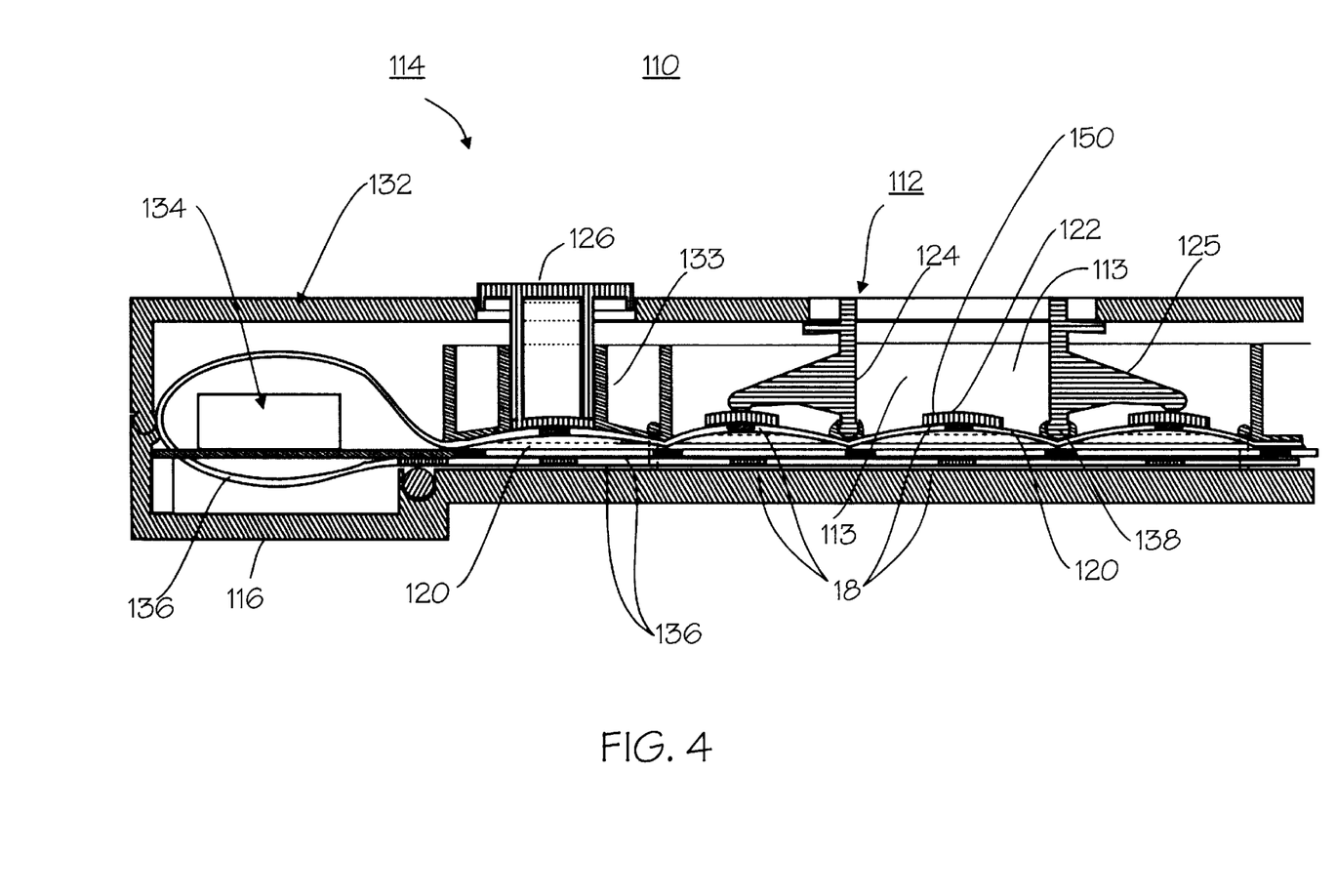
FIG. 4 is an alternate embodiment taken through the finger box and finger switch showing the currently preferred embodiment of the mechanical arrangement of the finger boxes and finger switches.

In a presently preferred embodiment, ergonomic keyboard, shown generally as 110 in FIG. 4, comprises keyboard housing 116, keyboard top 132, finger boxes 112, finger switches 114, circuit wiring 136, and electronic chip 134.

Finger box 112 includes finger opening 113, vertical key 122, horizontal lever 124, and 125, key domes 120, and contacts 118. Horizontal levers 125 and 124 pivot about and fit into slot joint 138.

Finger switch 114 includes vertical button 126, slidably received within button guide 133.

In use, similar to ergonomic keyboard 10, ergonomic keyboard 110 functions in an analogous fashion. The keyboard is arranged such that the fingers of a hand fall naturally into finger openings 113, of finger boxes 112. At least one finger box 112 is provided for each finger, and additionally, a similar finger box is provided for the thumb. The index and little fingers could have, for example, double finger boxes.

As described above, for finger box 12, finger box 112 can function as a three position and/or a five or seven position switch. Including the home position it could function as a four position, six position, or eight position switch.

Using finger box 112 as a three position switch, first position is obtained by depressing vertical key 122 downwards, and by deforming key dome 120 and making contact with contacts 118. Second position is obtained by horizontally urging horizontal lever 124 forward thereby pivoting horizontal lever 123 about slot joints 138, thereby depressing key dome 120 and closing contacts 118. Similarly, third position is obtained by horizontally urging horizontal lever 125 backwards thereby pivoting horizontal lever 125 about slot joint 138, thereby deforming key dome 120 and making contacts 118 closed.

Finger box 112, in addition to the three positions described above, has four additional positions; namely, vertically urging vertical key 122 and then urging horizontal lever 124 forward, thereby closing two key domes 120 consecutively. In the fifth position, vertical key 122 is urged downwards and then the horizontal lever 125 is urged backwards, thereby closing two key domes 120 and closing two pairs of contacts 118 consecutively. Reversing the sequence of closings gives two more positions. In this manner, finger box 112 has as many as seven discrete positions, and eight discrete positions including the neutral position.

If additional functions are required, finger switches 114 are installed in close proximity to finger boxes 112, and they are actuated by simply pushing vertically downwards on vertical button 126 which moves slidably within button guide 133, thereby deforming key dome 120 closing contacts 118.

Contacts 18 or 118 and as discussed herein may be of the standard touch contact type and/or they may be infra red contacts and/or radio frequency type switches and/or they may be optical type contacts. Contacts 18 or 118 may be any type known in the art to be used for this type of switch. Non mechanical contact mechanisms such as radio frequency switches or optical switches are preferable to improve the dependability and longevity of the contacts.

Figure 2:
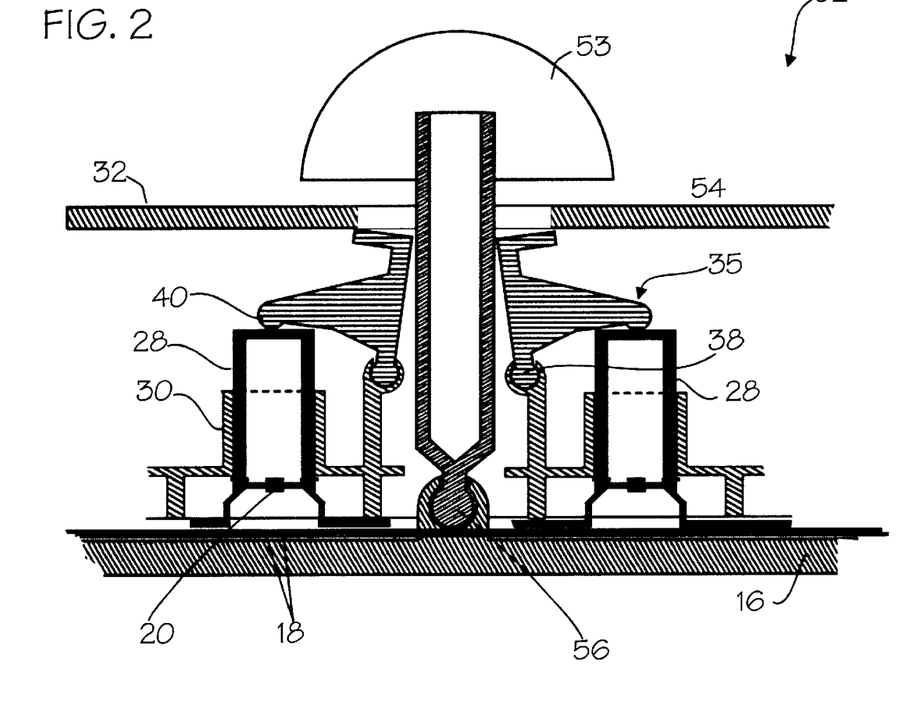
FIG. 2 is both a cross-sectional, side elevational view taken through palm/wrist pad 52 as well as a top partial cut-away view of the palm/wrist pad.

Referring now to FIG. 2, ergonomic keyboard 10 and 110 includes palm/wrist pads, shown generally as 52 in FIG. 2. Palm/wrist pad 52 includes a hand rest 53, a control stick 54, four horizontal levers 35, slot spot joints 38, four lever contacts 40, four lever keys 28, four key guides 30, four key domes 20, and four contacts 18.

Control stick 54 is attached to keyboard housing 16 via a ball and socket joint 56 as shown in FIG. 2. Palm/wrist pad 52 has five positions shown in FIG. 2; namely; a neutral position or the default position 90, forward position 82, rearward position 84, right position 86, and left position 88. The forward, right, rearward, and left positions are obtained in an analogous fashion as follows. For example, if one wishes to obtain the rearward position the hand or wrist is placed on hand rest 53, and is moved in such a manner to urge control stick 54 backwards, thereby urging horizontal lever 35 backwards pivoting it about slot joint 38, thereby making lever 35 contact with lever key 28, thereby urging lever key downwardly, deforming key dome 20, closing contacts 18. Control stick 54 pivots about ball and socket joint 56, and horizontal lever 35 pivots about slot joint 38. In analogous fashion by moving hand rest 53 forward, the forward position can be obtained and similarity, the right position 86 can be actuated and the left position 88 can be actuated. In this manner, by selecting a palm/wrist pad position 52, finger boxes 112 or finger boxes 12 can take on additional functions depending upon the palm/wrist pad position 52.

Figure 5:
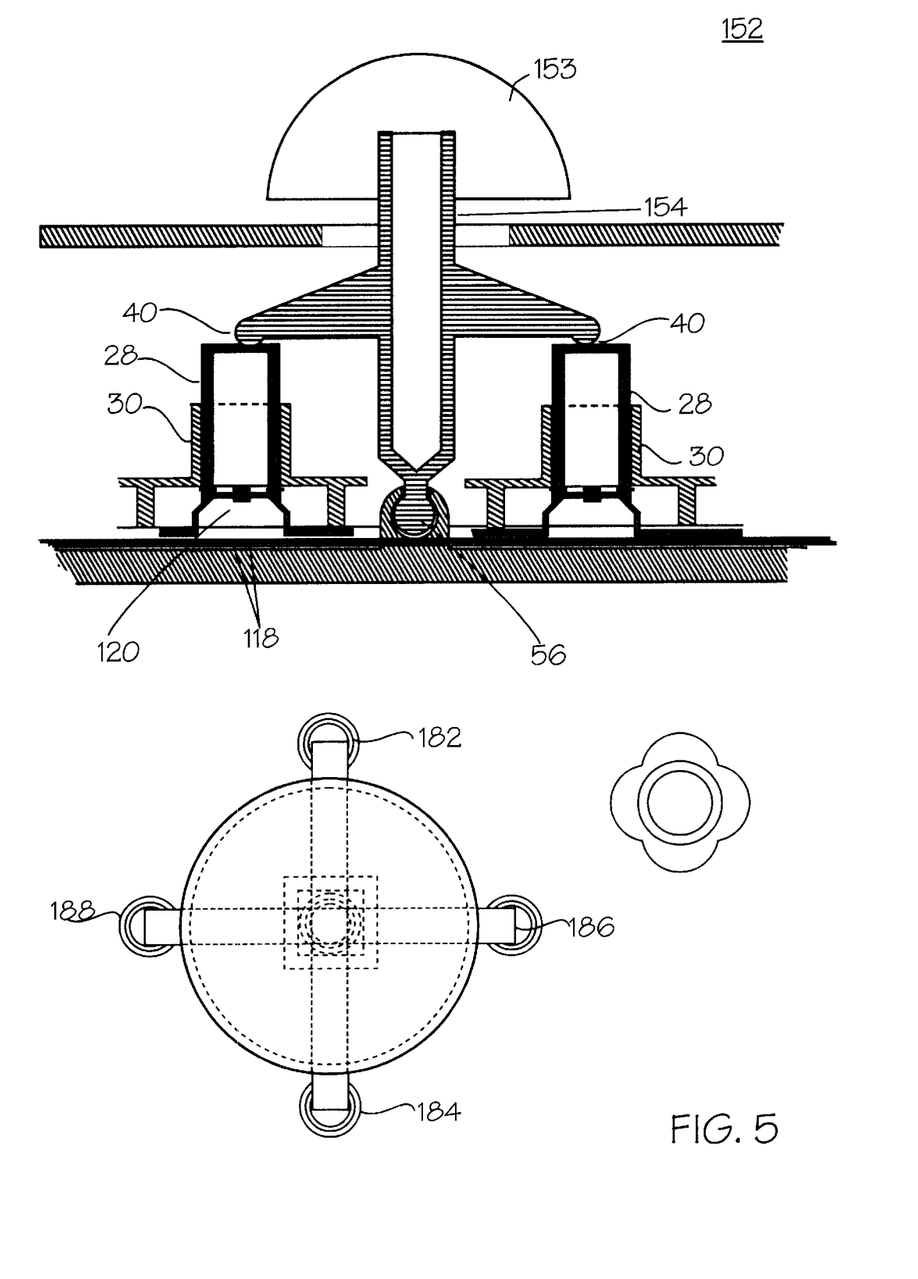
FIG. 5 is a currently preferred embodiment of the palm/wrist pads, shown both in cross-sectional elevational plan view as well as in partially cut-away top view.

Referring now to FIG. 5, which is a presently preferred embodiment of palm/wrist pad shown generally as 152, and includes hand rest 153, control stick 154, lever contacts 40, lever key 128, key guide 30, contact 18, ball and socket joint 56, and key dome 20. Palm/wrist pad 152 operate in an analogous fashion to the palm/wrist pad 52, shown in FIG. 2. The major difference is that control stick 154 has rigidly attached to it and integrally connected levers which is not the case with palm/wrist pad 52. Utilizing this design eliminates the need for horizontal levers 35 shown in FIG. 2 as well as slot joints 38. Therefore, by incorporating horizontal levers 35 directly into control stick 54 as shown as the new control stick 154 in FIG. 5, enough of the components have been eliminated making the design much simpler. Again, hand rest 153 can be moved into four positions, forward position 182, rearward position 184, right position 186, left position 188 by urging hand rest 153 in the appropriate direction. The contacts are activated in an analogous fashion to palm/wrist pad 52 by urging lever key 28 slidably along key guide 30 to deform key dome 20, thereby closing contacts 18.

For example, forward position 182 may invoke capital letters and other functions. Rearward position 184 may invoke numbers, calculations, mathematics and calculations. If needed, right 186 and left 188 positions may invoke signs and symbols used by the different trades and professions.

Figure 6:
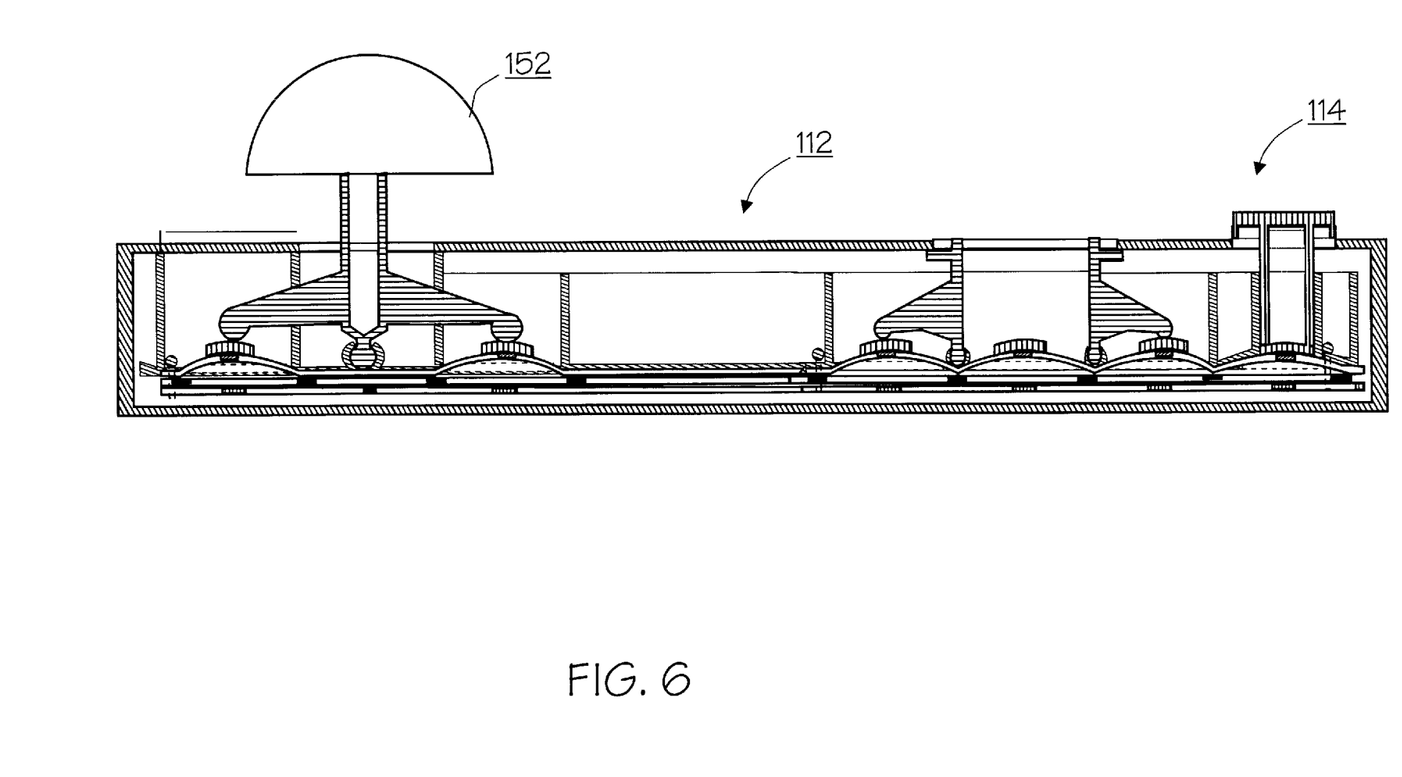
FIG. 6 is a schematic cross-sectional plan view taken through the finger box, finger switch as well as the palm/wrist pad 52 showing the mechanical arrangement of the currently preferred embodiment showing how the finger box, finger switch, and palm/wrist pad would typically be mounted in the ergonomic keyboard.

Referring now to FIG. 6, which shows the presently preferred embodiment of ergonomic keyboard 10 in a schematic fashion as the cross-sectional view through finger switch 114, finger box 112, and palm/wrist pad 152. This figure shows one potential arrangement of the finger switches, finger boxes, and palm/wrist pads that are possible.

Figure 7:
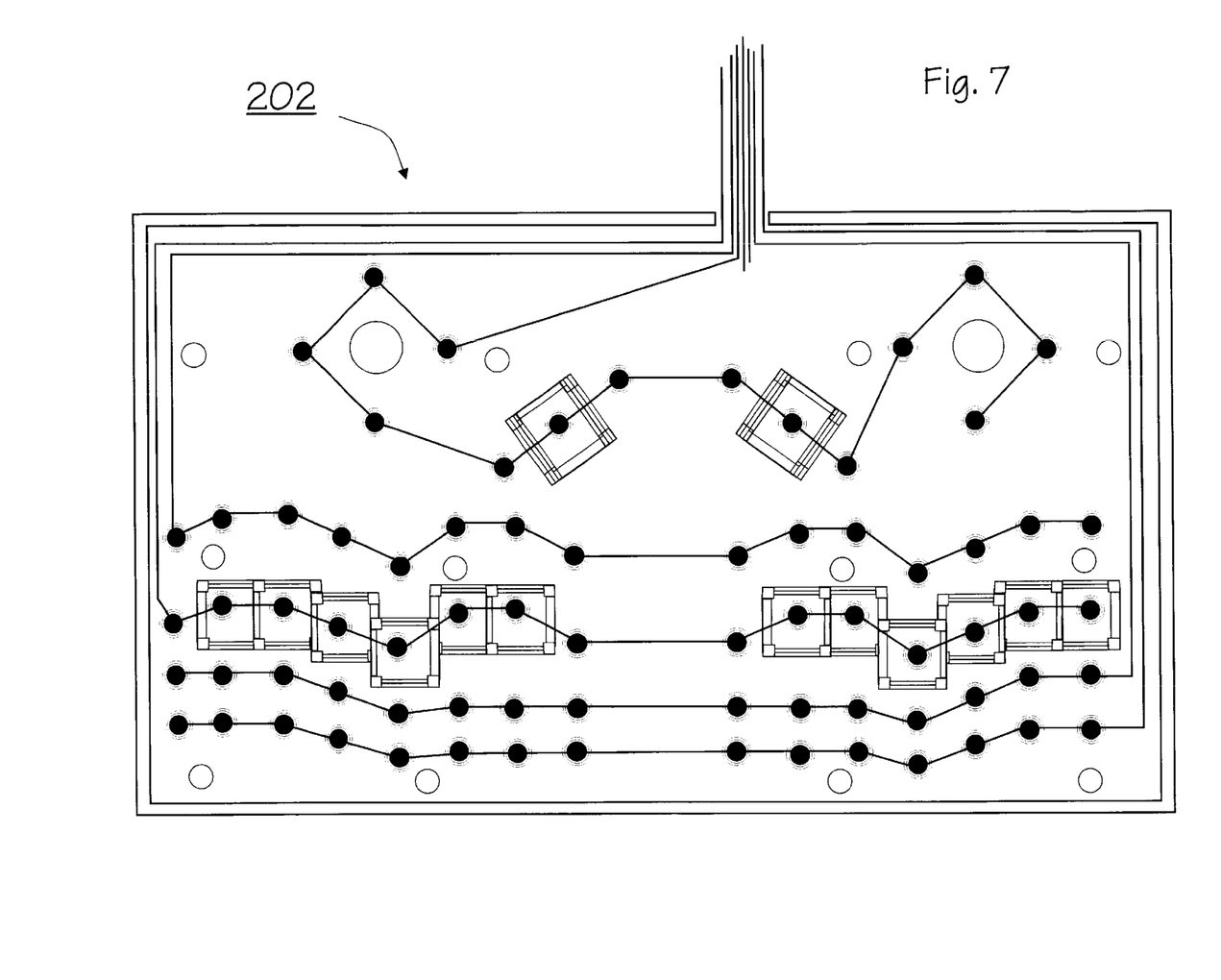
FIG. 7 is a cut-away schematic top plan view showing the wiring which typically could be used to inter-connect the finger boxes and finger switches as well as the palm/wrist pads.

FIG. 7 shows a printed circuit diagram 202 showing a portion of the wiring required for the finger boxes, finger switches, and palm/wrist pads.

Figure 8:
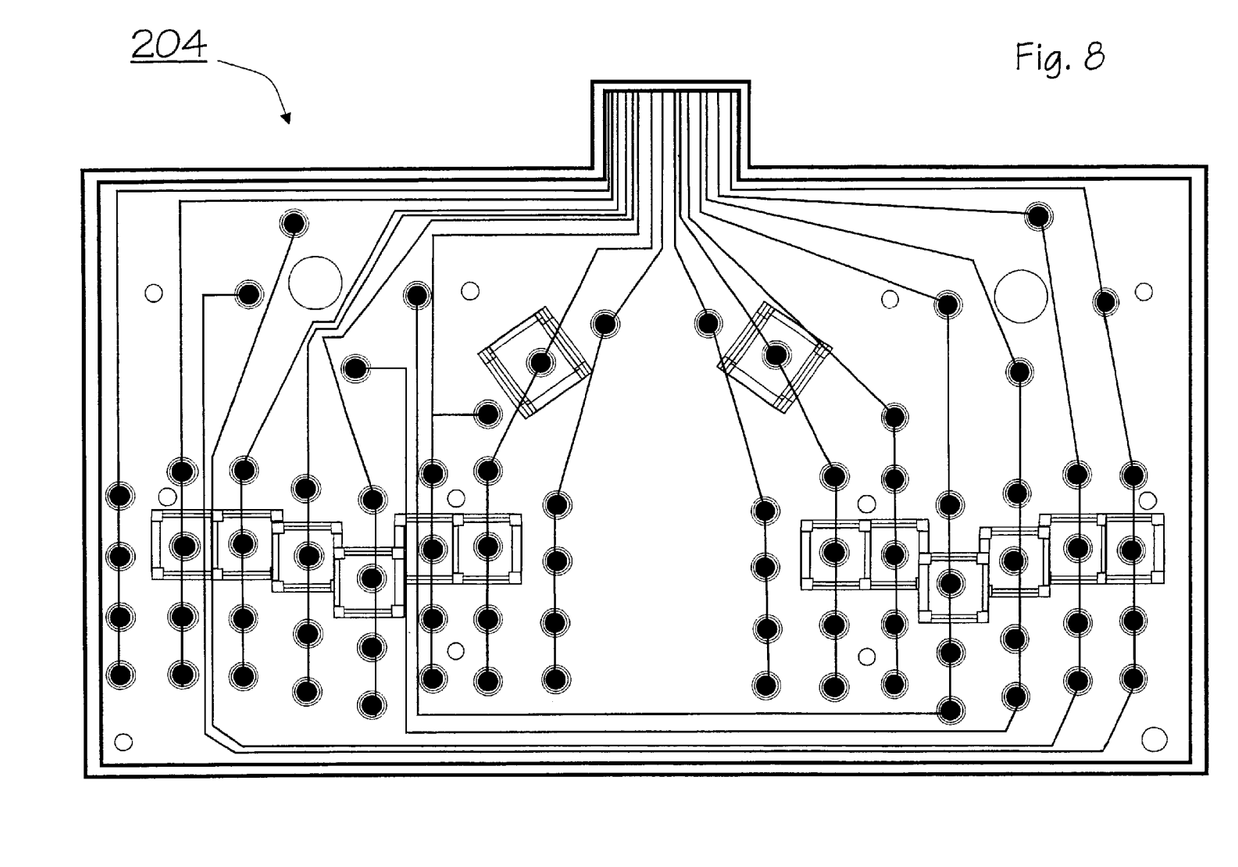
FIG. 8 is a cut-away schematic top plan view showing the wiring which typically could be used to inter-connect the finger boxes and finger switches as well as the palm/wrist pads.
Figure 9:
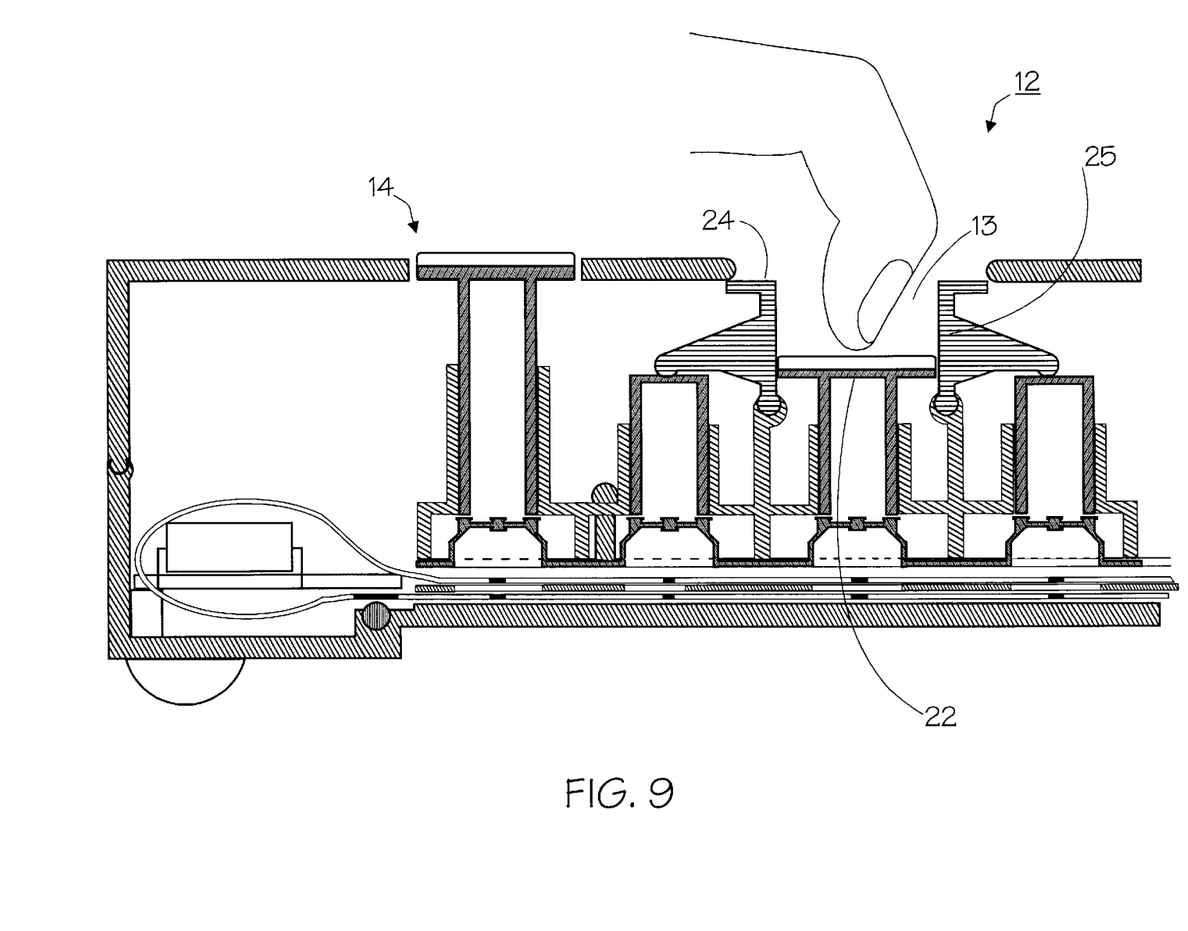
FIG. 9 is a side elevational view of the present invention, an ergonomic keyboard, taken through finger box 12 and finger switch 14 in order to show the details of the mechanical arrangement showing a finger in the finger box.
Figure 10:
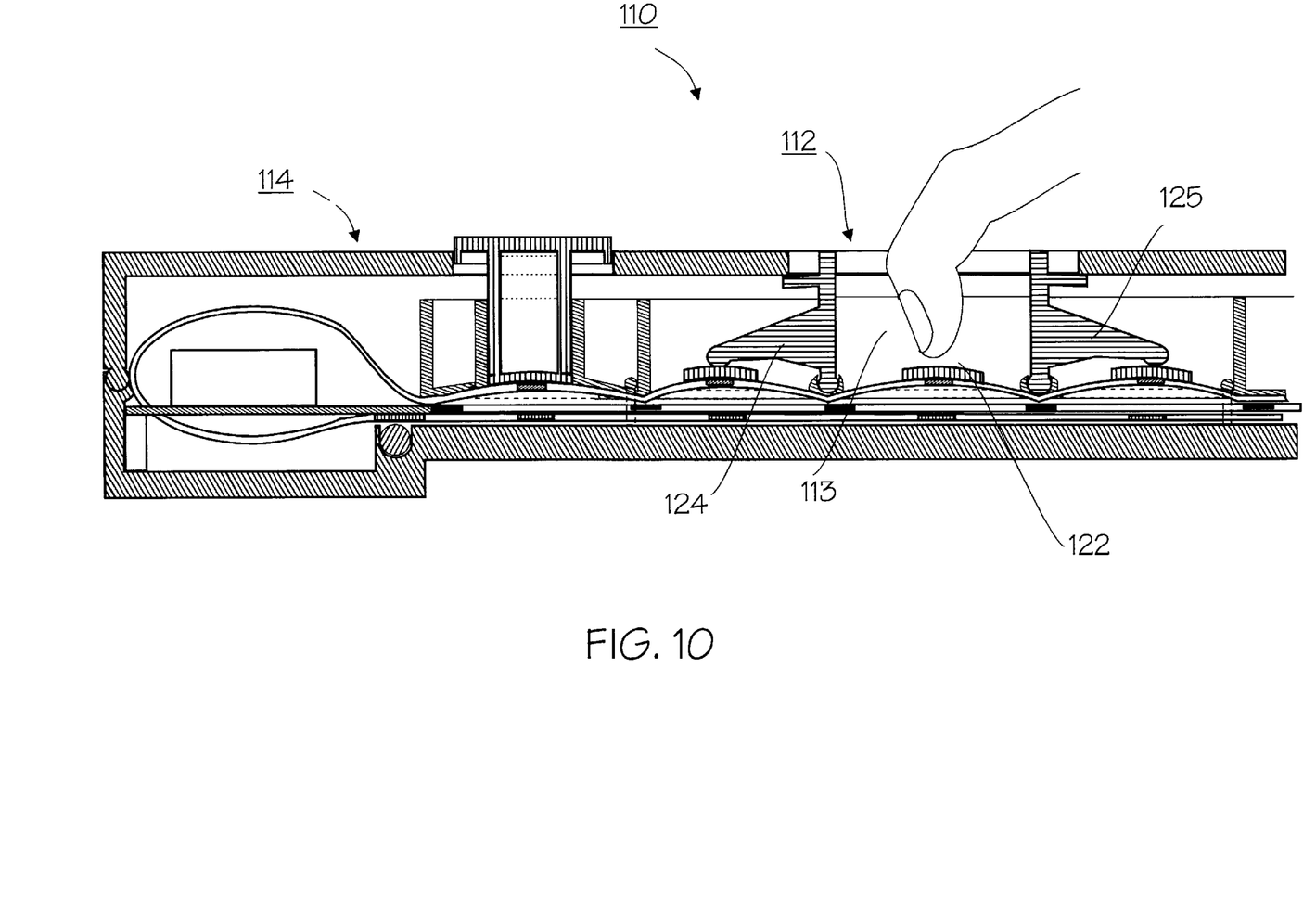
FIG. 10 is a side elevational view of the present invention, an ergonomic keyboard, taken through finger box 112 and finger switch 114 in order to show the details of the mechanical arrangement showing a finger in the finger box.
Figure 11:
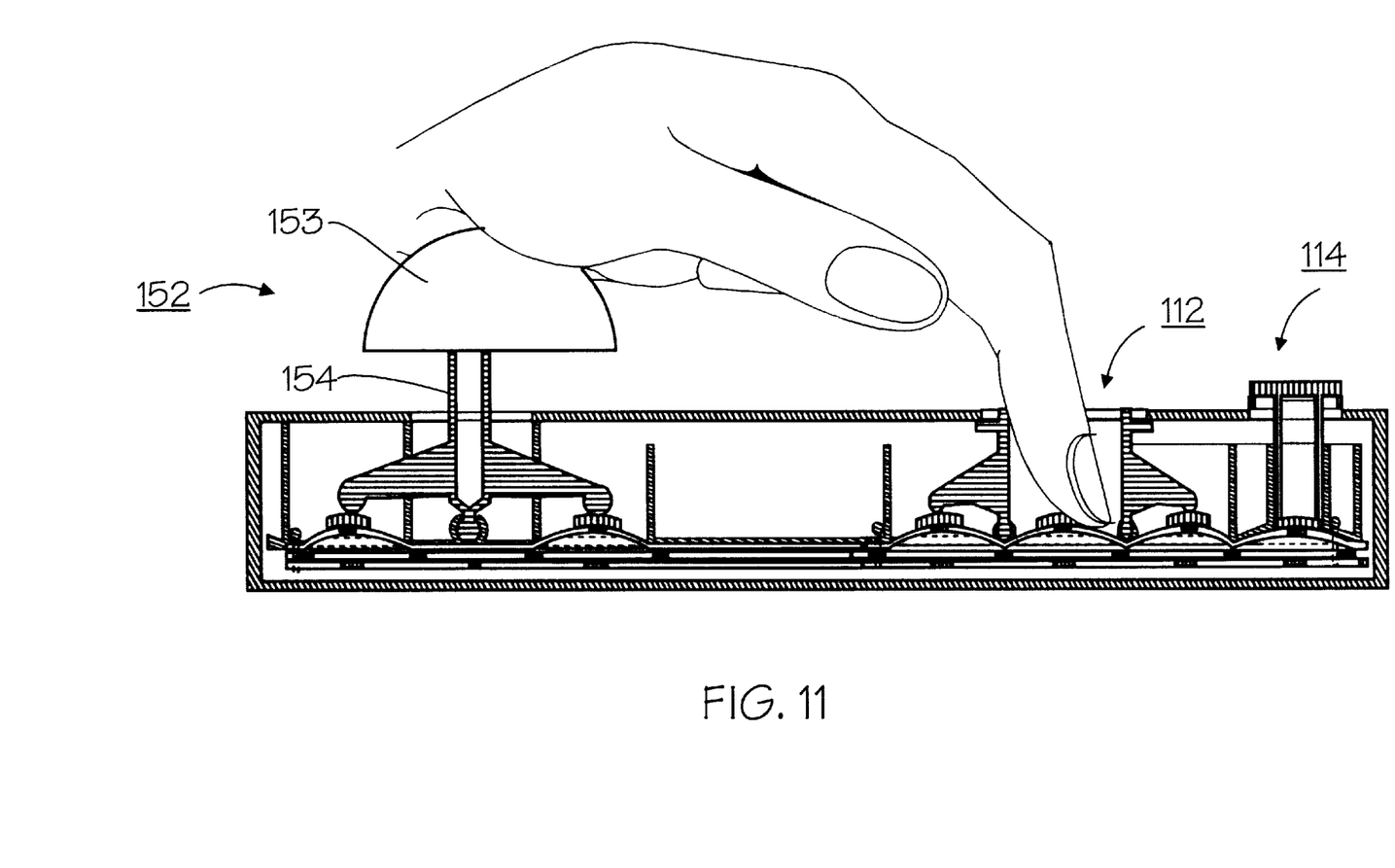
FIG. 11 is a schematic cross-sectional plan view taken through the finger box, finger switch as well as the palm/wrist pad 152 showing the mechanical arrangement of the currently preferred embodiment showing bow the finger box, finger switch, and palm/wrist pad would typically be mounted in the ergonomic keyboard showing a hand on palm/wrist pad and finger in the finger box.

FIG. 8 shows the other portion of the printed circuit diagram 204 which is used in conjunction with printed circuit diagram 202 in order to provide for contacts 18, which are actuated by finger boxes 112, finger switches 114, and palm/wrist pads 152.

It should be apparent to persons skilled in the arts that various modifications and adaptation of this structure described above are possible without departure from the spirit of the invention the scope of which defined in the appended claim.

I claim:

1. An ergonomic keyboard for inputting data, said keyboard comprising;
   a) a keyboard housing;
   b) a plurality of four position finger boxes mounted in said housing and arranged conformably to receive finger tips of a users hand, wherein said finger boxes are responsive to depression, contraction and extension of said fingertips including at least 4 distinct finger box positions namely: neural, downward backward, and forward respectively;
   c) means for assigning letters, numerals, symbols and functions to each of said positions of said finger boxes, d) means for sensory of each of the positions of each of said finger boxes such that a unique signal is produced for each position of said finger boxes, e) wherein said finger boxes include a vertical key with cooperating first contacts, and at least two horizontal lever means each with cooperating second contacts, said vertical key responsive to depression of said fingertip for closing of said first set of contacts, said horizontal lever means responsive to horizontal contraction or extension of said fingertip for closing said second contacts of contacts, and, f) wherein said horizontal lever means includes at least two horizontal levers operably connected to said second contacts, each lever pivotally attached to said keyboard housing with a slot joint such that said horizontal levers pivot about said slot joint when horizontally urged by a finger tip operably converting lever horizontal motion to lever vertical motion for closing said second contacts; and g) further comprising at least one palm/wrist pad elevated above said keyboard top for placement of palm or wrist thereon such that when a users palm or wrist rests on said palm/wrist pad a users finger tips fall namely into said finger boxes, wherein said palm/wrist pad including a three position pad normally positioned in a neutral position, and moveable into a forward position and rearward position; and further including a means sensory of each of the positions of each of said palm/wrist pads, such that a unique signal is produced for each position of said finger boxes corresponding to each position of the palm/wrist pad thereby tripling the number of unique signals obtainable from each finger box.

2. The ergonomic keyboard claimed in claim 2, wherein said horizontal lever means includes lever keys slideably housed within key guides, said lever keys cooperatively operable with said horizontal levers, such that horizontally urging said horizontal lever in turn urges vertically said lever key slidably within said key guide thereby converting horizontal lever horizontal motion to lever key vertical motion for actuating vertically said second contacts.

3. The ergonomic keyboard claimed in claim 2, wherein said horizontal lever includes an L shaped lever, wherein an upstanding portion of said lever is for receiving finger pressure and a horizontal portion of said L shaped lever is for contacting said lever key at a lever contact such that actuating said horizontal lever horizontally, urges vertically said lever key thereby operably closing said second contacts.

4. The ergonomic keyboard claimed in claim 3, wherein said L shaped lever includes a slot joint proximate the intersection of the upstanding portion and the horizontal portion such that said L shaped lever pivots about said slot joint.

5. The keyboard claimed in claim 1 wherein said finger boxes are six position finger boxes adapted to be responsive to 6 distinct finger tip positions, namely: neutral, downward, backward, and forward and in addition, said finger boxes being responsive to sequential movement of the fingertip namely forward then downward movement of said fingertips being the fifth position and backward then downward movement of the fingertip being the sixth position.

6. The keyboard claimed in claim 5 wherein said finger boxes are eight position finger boxes adapted to be responsive to 8 distinct finger tip positions, namely: neutral, downward, backward, and forward, forward then downward, backward then downward, said finger boxes being responsive to further sequential movements of the fingertip namely downward then forward being the seventh position, and downward then backward being the eighth position.

7. The keyboard claimed in claim 1 wherein said keyboard includes at least five finger boxes, one for each finger and thumb.

8. The keyboard claimed in claim 1, wherein said keyboard includes two palm/wrist pads and at least ten finger boxes; one pad for each hand and one finger box for each finger and thumb.

9. The keyboard claimed in claim 1, wherein said keyboard includes two palm/wrist pads and at least fourteen finger boxes; one pad for each hand and one finger box for each finger and thumb, two finger boxes for the index and little fingers of both hands.

10. The keyboard claimed in claim 1, wherein a) said palm/wrist pad is a five position pad movable into a neutral position, forward position, rearward position, left position and right position; and b) further including a means sensory of each of the positions of each of said palm/wrist pads such that a unique signal is produced for each position of said finger boxes corresponding to each position of the palm/wrist pad, thereby increasing five fold the number of unique signals available from each finger box.

11. The keyboard claimed in claim 1 wherein said palm/wrist pad comprises:

a) a hand rest adapted for receiving the palm of a hand thereon;

b) a moveable control stick attached at one end to said hand rest and at the other end connected to said keyboard housing with a ball and socket joint, such that said control stick pivots about said ball and socket joint when actuated, c) said control stick further operably connected to at least one palm horizontal lever means for operably closing palm contacts, such that pivoting said control stick against said horizontal lever means operably closes a set of palm contacts, and d) further including a means sensory of each of the positions of each of said palm/wrist pads.

12. The ergonomic keyboard claimed in claim 11, wherein said palm horizontal lever means includes at least one palm horizontal lever operably connected to said palm contacts, each palm horizontal lever pivotally attached to said keyboard housing with a slot joint such that said palm horizontal levers pivot about said slot joint when horizontally urged by said control stick, and further including palm lever keys slideably housed within key guides, said palm lever keys cooperatively operable with said palm horizontal levers, such that horizontally urging said palm horizontal lever in turn urges vertically said palm lever key slidably within said key guide thereby converting palm horizontal lever motion to palm lever key vertical motion for actuating vertically said second contacts.

13. The ergonomic keyboard claimed in claim 12, wherein said palm horizontal lever includes an L shaped palm lever, wherein an upstanding portion of said palm lever is for receiving control stick urging and a horizontal portion of said L shaped palm lever is for contacting said palm lever key at a lever contact, such that actuating said palm horizontal lever inturn urges vertically said palm lever key thereby operably closing said palm contacts.

14. The ergonomic keyboard claimed in claim 13, wherein said L shaped palm lever includes a slot joint proximate the intersection of the upstanding portion and the horizontal portion such that said L shaped palm lever pivots about said slot joint.

* * * * *